United States Patent [19]

Fennel et al.

[11] Patent Number: 4,975,852
[45] Date of Patent: Dec. 4, 1990

[54] CIRCUIT CONFIGURATION FOR CONTROLLING THE AUXILIARY ENERGY SUPPLY SYSTEM OF A BRAKE SYSTEM WITH ANTI-LOCK CONTROL AND/OR TRACTION SLIP CONTROL

[75] Inventors: Helmut Fennel, Bad Soden; Ivica Batistic, Frankfurt am Main, both of Fed. Rep. of Germany

[73] Assignee: Alfred Teves GmbH, Frankfurt am Main, Fed. Rep. of Germany

[21] Appl. No.: 351,909

[22] Filed: May 15, 1989

[30] Foreign Application Priority Data

May 28, 1988 [DE] Fed. Rep. of Germany ....... 3818260

[51] Int. Cl.$^5$ ...................... G06F 15/48; G06F 15/50; G05B 13/02; G06G 7/57
[52] U.S. Cl. .......................... 363/426.02; 364/426.03; 364/148; 364/510
[58] Field of Search ...................... 364/426.01, 426.02, 364/426.03, 424.01, 426.04, 148–150, 510

[56] References Cited

U.S. PATENT DOCUMENTS

| 4,340,935 | 7/1982 | Anlauf et al. | 364/426.01 |
| 4,494,199 | 1/1985 | Lehmann | 364/426.01 |
| 4,771,387 | 9/1988 | Hexel et al. | 364/426.02 |
| 4,802,562 | 2/1989 | Kuroyanagi et al. | 364/426.01 X |

Primary Examiner—Parshotam S. Lall
Assistant Examiner—Edward Pipala
Attorney, Agent, or Firm—Robert P. Seitter

[57] ABSTRACT

A circuit configuration for controlling the auxiliary-energy supply system of a brake system with anti-lock control and/or traction slip control. A volume pattern (VM) is created by measuring and evaluating quantities which determine the auxiliary energy requirement and, respectively, the pressure fluid flow. The volume pattern represents by approximation the pressure fluid discharge out of the master cylinder of the brake system as well as the pressure fluid requirement and is utilized for controlling the auxiliary-energy supply system (HEV). For forming the volume pattern (VM), a pedal force surplus (PKU) is definable which, in turn, is correlated with the initial gradient.

7 Claims, 1 Drawing Sheet

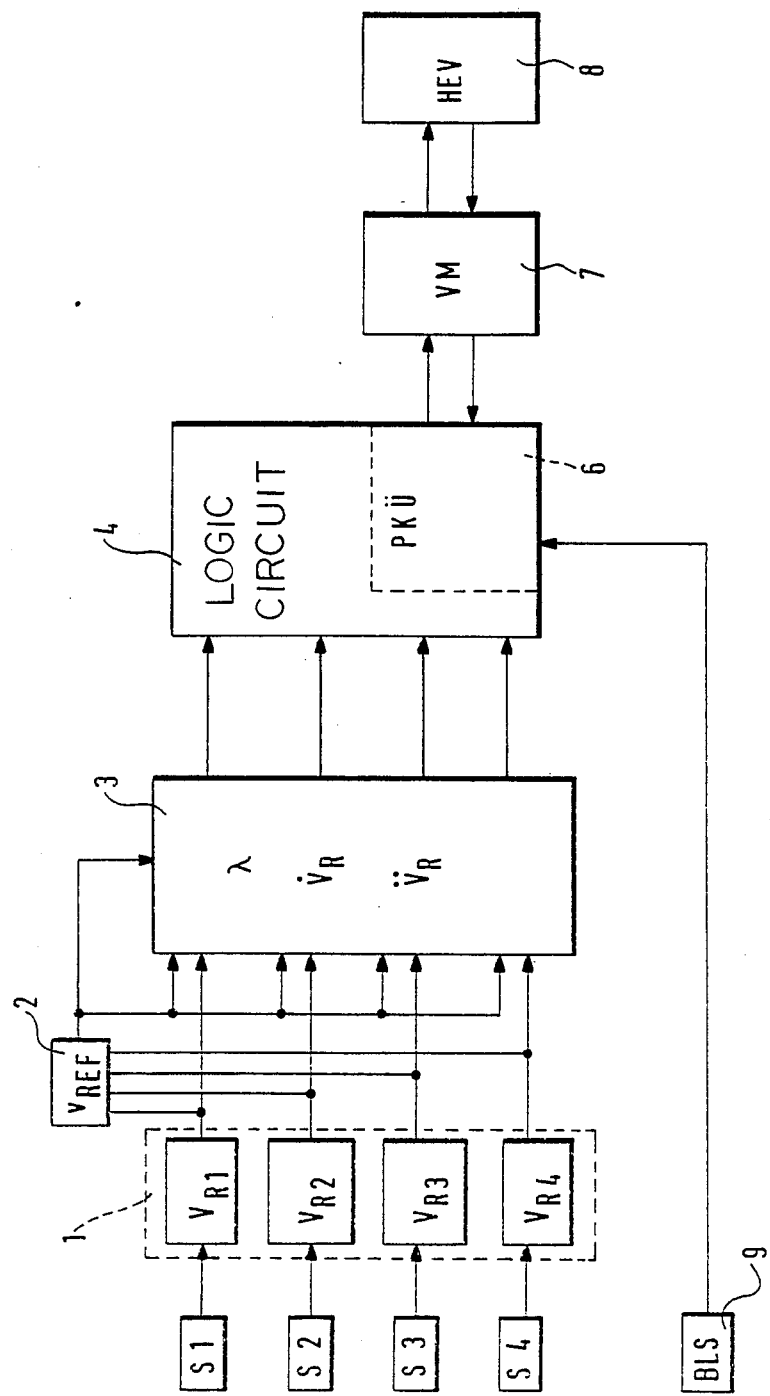

CIRCUIT CONFIGURATION FOR CONTROLLING THE AUXILIARY ENERGY SUPPLY SYSTEM OF A BRAKE SYSTEM WITH ANTI-LOCK CONTROL AND/OR TRACTION SLIP CONTROL

BACKGROUND OF THE INVENTION

The present invention relates to a circuit configuration for controlling a hydraulic brake system with anti-lock control and/or traction slip control. Pressure fluid is discharged from the wheel brake into a pressure-compensating reservoir for pressure reduction during a control action. Pressure fluid is introduced and/or returned into the brake circuit by activating or connecting an auxiliary-pressure source.

Auxiliary enengy is required for anti-lock or traction slip control performed by a brake system which is supplied for example by an auxiliary-pressure supply system. For this purpose, known brake systems of this type are equipped, for example, with a hydraulic pump which is run constantly or which is not switched on until commencement of the control operation. Some brake systems have an additional pressure-fluid accumulator, the condition of charge of which dictates the switching-on and off of the hydraulic pump.

The auxiliary energy, that is the auxiliary pressure, primarily is necessary in such controlled brake systems in order to compensate for the energy that is released in the phase of pressure reduction. The pressure fluid removed from the wheel brake and discharged into the pressure-compensating reservoir is pumped back into the brake circuit by means of the pump or is replaced by pressure fluid out of the accumulator.

The magnitude of pressure-fluid consumption widely varies depending upon the brake system and the mode of control. Frequent strong braking pressure variations with rapid braking pressure reduction and re-increase result in excessive auxiliary-energy consumption and are perceived by the driver as being unpleasant. Therefore, attempts have been made to control the pressure reduction and re-increase, to the extent possible, in such a fashion that the pressure amplitudes are low and the pressure in the wheel brake is maintained to the optimal braking pressure. This then provides a more comfortable pedal feeling. The amount of the auxiliary energy that is required in the worst case will adversely effect the manufacturing costs of the system, in particular, the size of the hydraulic pump, the (electric) drive motor of the pump and, in some cases, the hydraulic accumulator.

Therefore, it is an object of the instant invention to provide a circuit configuration for controlling an auxiliary-energy supply system which results in minimum auxiliary-energy consumption and which controls the pressure-variation amplitudes during a control action to a comparatively small value.

SUMMARY OF THE INVENTION

It has been found that this object is achieved by a circuit configuration of the type initially referred to, the special characteristics of which being that a volume pattern is created by measuring and evaluating quantities which determine the demand in auxiliary energy or the pressure-fluid flow, which volume pattern represents by approximation the pressure-fluid discharge out of the master cylinder of the brake system and the pressure-fluid requirement and which is assessable for controlling the auxiliary-energy supply system, that is for activating or connecting it.

In accordance with the present invention, a volume pattern is formed by measuring and evaluating, by memorizing, integrating and logically combining, quantities which depend on the energy requirement and the energy consumption, or an electric signal produced which is particularly suitable for controlling the generation and the supply of auxiliary energy. While in previous system auxiliary energy had to be provided for the most unfavorable case, the following description of the present invention teaches that it is sufficient to activate or connect the auxiliary-energy supply system only if there is need for it, and, advantageously, only to the extent such energy is required. In many cases, the energy available will be sufficient, for instance in the initial phase of the control, in the event of a short-time control, when control is limited to one wheel etc., so that there is no need to activate the auxiliary-energy supply system. This has the advantage that the undesirable resetting of the brake pedal, which is caused when the auxiliary-energy supply means is activated and in the absence of a positioning device, will not occur. That is, the pedal comfort is accomodated.

According to an advantageous embodiment of the inventive circuit configuration, for forming the volume pattern during an anti-lock control action, the so-called pedal force surplus which results in a surplus of energy and pressure in the master cylinder compared to the energy and pressure requirement in the wheel brake of the controlled wheel is definable by approximation. To determine the pedal force surplus, the initial gradient which influences the speed of the pressure rise in the master cylinder of the brake system can be determined. As a criterion for determining the initial gradient, for example, the time span between the commencement of brake application (as signalled for example by brake light switches) and the occurrence of an anti-lock control signal or a critical wheel-deceleration value can be ascertained. For example, in order to define the volume pattern, the switching positions and on/off periods of valves controlling the pressure-fluid flow from the master cylinder to the wheel brakes and from the wheel brakes to the pressure-compensating reservoir can be ascertained and assessed. Likewise the frequency of the pressure modulation during an anti-lock control action can be evaluated for determining the pedal force surplus. A circuit configuration to practice the present invention can be realized by hard-wired or programmed electronic circuits, as is well known in the art. Further, it can be expedient in a traction slip control action to ascertain the demand in auxiliary energy and auxiliary pressure by measuring the slip, the instantaneous engine power etc. and to control the auxiliary-energy supply system to such an extent so that only exactly the amount of energy actually required is generated and made available.

BRIEF DESCRIPTION OF THE DRAWING

Further features, advantages and applications of the present invention are setforth in the following detailed description of an embodiment taken in conjunction with the accompanying drawing in which the single FIGURE illustrates a block wiring diagram which displays a circuit configuration according to the present invention for controlling the auxiliary-energy supply system.

DETAILED DESCRIPTION

Referring now to the drawing, the rotational behavior of the individual vehicle wheels is obtained by way of wheel sensors S1 to S4 in the embodiment described herein. These sensors can be inductive transducers which are placed opposite to a toothed disc co-rotating with the wheel, and the output signals of the sensors is then supplied in the form of an alternating signal whose frequency is proportional to the wheel speed.

The signals of the sensors S1 to S4 are amplified and processed in the circuit blocks 1. In a circuit 2, a vehicle reference speed $v_{REF}$ is formed according to a predefined algorithm and permits comparison of the wheel speeds $v_{R1}$ to $v_{R4}$ in a known fashion in order to recognize locking tendencies and to initiate appropriate control measures. In a circuit 3, this comparison is made between the vehicle reference speed $v_{REF}$ and the wheel speeds $v_{R1}$ to $v_{R4}$. The amount of slip is ascertained. Further, variations of these quantities, that is of the speeds and the decelerations or accelerations, are determined by differentiation of the wheel speed and by formation of the second time derivative. By virtue of these measured quantities and derivatives as well as by multiple logical combining of the quantities, the signals for controlling the individual wheel valves or pairs of wheel valves are formed in the logic circuitry. These wheel valves, that is the inlet and outlet valves, are provided in the pressure-fluid conduits and to keep the braking pressure constant, to decrease it or increase it for conducting an anti-lock or traction slip control action.

The required information and criteria for forming the volume pattern VM that is required in the practice of the present invention are obtained by signal processing in a circuit 6 which is part of the logic circuitry 4. When a programmed circuit is utilized, such as for example, a microcomputer, this circuit 6 can be realized by a corresponding program. With the output signals of this circuit 6, the actual volume pattern VM is formed in a circuit 7, by way of the outlets of which the auxiliary-energy supply system (HEV) 8 ultimately is connected.

For forming the volume pattern VM and for controlling the auxiliary energy supply system HEV, the pedal force surplus (PKU) is calculated and estimated by means of the circuit 6, which surplus has a major effect on the commencement of anti-lock control, on the necessary braking pressure reduction during the control phases and, therefore, on the energy surplus and energy consumption. The surplus in energy and pressure in the master cylinder when compared to the optimal braking pressure in the wheel brake cylinder is substantially influenced by the so-called initial gradient which depends upon the manner of pedal application and the force exerted and which, upon panick braking in a case of emergency, is much greater than when the pedal is applied carefully. This initial gradient can be evaluated, for example, by measuring the time between the commencement of the braking operation and the response of the anti-lock control. To determine the point of time of commencement of braking, a signal from a brake light switch (BLS) 9 is supplied into the circuit 6. The time span between the commencement of braking and the attainment of a critical wheel deceleration also is suitable for determining the initial gradient. Upon the commencement of anti-lock control the amount of vehicle deceleration also will furnish important information, for example, about the instantaneous road conditions or the co-efficient of friction.

This pedal force surplus which determines the surplus in energy and pressure in the master cylinder, and the valve control, that is the on/off times of the inlet and the outlet valves, are the most important quantities for forming the volume pattern for evaluating the actual energy consumption and energy requirement. Hence, it follows that this volume pattern represents the suitable quantity for activating or connecting an auxiliary-energy supply system HEV.

In many cases, the auxiliary-energy supply system basically comprises an electromotively driven hydraulic pump which is switched on and off again in response to the output signals of the volume pattern 7. If an energy supply system with a pressure accumulator is provided, the pressure-fluid supply is connected by virtue of the volume pattern 7 with switchable multi-directional valves for predefined time spans which correspond to the volume pattern. Expediently, the volume pattern 7 also is realized by an integration with the circuit 4 and the pertinent circuit 6. When using programmed electronics, the volume pattern 7, in turn, can be realized by program steps, as is known and will be appreciated by those skilled in the art.

What is claimed is:

1. A circuit configuration for controlling the auxiliary-energy supply system of a hydraulic brake system having at least one of (i) anti-lock control and (ii) traction slip control, wherein pressure fluid is discharged from the wheel brake into a pressure-compensating reservoir for pressure reduction during a control action, and wherein pressure fluid is introduced and returned into the brake circuit by activating or connecting an auxiliary-pressure source, wherein a volume pattern (VM) is created by measuring and evaluating quantities which determine the demand in auxiliary energy or the pressure-fluid flow, which volume pattern represents by approximation the pressure-fluid discharge out of the master cylinder of the brake system and the pressure-fluid requirement and which volume pattern is utilized for controlling the auxiliary-energy supply system (HEV), for activating and connecting said supply system (HEV).

2. A circuit configuration as claimed in claim 1, wherein for forming the volume pattern (VM) during an anti-lock control action, the pedal force surplus (PKU) which results in a surplus of energy and pressure in the master cylinder compared to the energy and pressure requirement in the wheel brake of the controlled wheel is determined by approximation.

3. A circuit configuration as claimed in claim 2, wherein to determine the pedal force surplus (PKU), the initial gradient which influences the speed of the pressure rise in the master cylinder of the brake system is ascertained.

4. A circuit configuration as claimed in claim 3, wherein as a criterion for determining the initial gradient, the time span between the commencement of brake application and the occurrence of at least one of an anti-lock control signal or a critical wheel-deceleration value is ascertained.

5. A circuit configuration as claimed in claim 2, wherein the frequency of the pressure modulation during an anti-lock control action is utilized for determining the pedal force surplus (PKU).

6. A circuit configuration as claimed in claim 1, wherein for forming the volume pattern (VM) the switching positions and on/off periods of valves controlling the pressure-fluid flow to the wheel brakes and to the pressure-compensating reservoir is measured.

7. A circuit configuration as claimed in claim 1, wherein a traction slip control action including at least one of the instantaneous wheel slip or the instantaneous engine power is measured and assessed to ascertain the demand in auxiliary energy.

* * * * *